United States Patent [19]

Frauenhoffer et al.

[11] 4,175,319
[45] Nov. 27, 1979

[54] APPARATUS FOR ASSEMBLING ROLLER BEARINGS

[75] Inventors: Josef Frauenhoffer, Mühlheim; Gerd Rüger, Heusenstamm, both of Fed. Rep. of Germany

[73] Assignee: Löhr & Bromkamp GmbH, Offenbach, Fed. Rep. of Germany

[21] Appl. No.: 880,359

[22] Filed: Feb. 23, 1978

[30] Foreign Application Priority Data

Mar. 2, 1977 [DE] Fed. Rep. of Germany ....... 2708990

[51] Int. Cl.² .................. B23P 19/04; F16C 43/06
[52] U.S. Cl. ............................ 29/724; 29/148.4 A
[58] Field of Search ......................... 29/724, 148.4 A

[56] References Cited

U.S. PATENT DOCUMENTS 2,407,016  9/1946  Kalister et al. ................. 29/724 X
3,789,478  2/1974  Stenger ........................... 29/724

*Primary Examiner*—Francis S. Husar
*Assistant Examiner*—V. K. Rising
*Attorney, Agent, or Firm*—Toren, McGeady and Stanger

[57] ABSTRACT

Roller bearings are assembled in a circumferential path with a bearing bushing by successively feeding roller bearings to an annular channel formed between a piston and an outer sleeve member. The roller bearings are accumulated in the annular channel until a predetermined number of roller bearings occupy the channel. An axial force is then simultaneously applied to each of the roller bearings accommodated within the annular channel to insert the accumulated roller bearings into a prepositioned bearing bushing. The plurality of roller bearings are fed to and supported in the annular channel in the direction of insertion into the bearing bushing.

5 Claims, 4 Drawing Figures

FIG. 3
FIG. 4
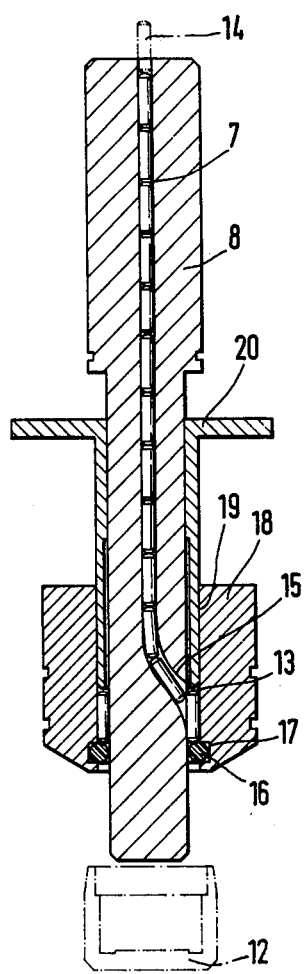
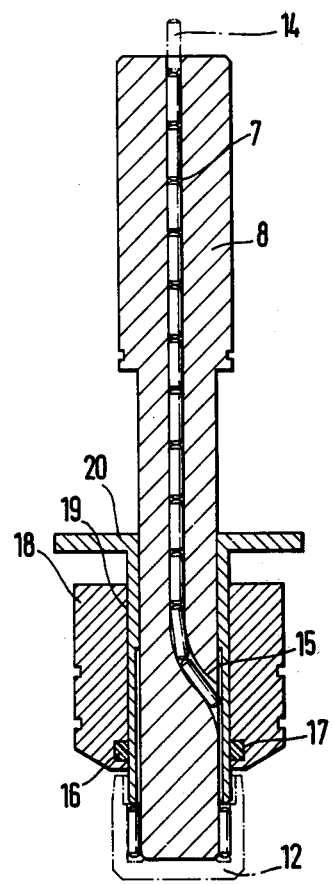

APPARATUS FOR ASSEMBLING ROLLER BEARINGS

BACKGROUND OF THE INVENTION

The present invention relates generally to the assembly of roller bearings, and more particularly to a method and apparatus for inserting a predetermined number of roller bearings into a bearing bushing by first accumulating the required number of roller bearings and then simultaneously forcing the accumulated roller bearings axially into the bearing bushing.

Conventional methods for assembling such roller bearings, such as illustrated in German OS No. 2 019 922 provide for the initial arrangement of individual roller bearings in side by side relation, after which the required number of roller bearings are fed into an annular channel around a piston. In this arrangement, a collector channel is used to feed the individual roller bearings into the side by side position. The disadvantage of this conventional method is that the individual roller bearings must be precisely lined up in parallel relationship with one another when the collector channel has the required number of roller bearings. This, however, can only be ascertained by using a special counting device. Additionally, the collector channel must be pivoted in order to slide the individual roller bearings into the annular channel about the piston in a direction perpendicular to the axis of each roller bearing. If the counting device should fail or indicate the improper number, the entire assembly device will no longer function. Additionally, the apparatus required for this method is extremely expensive in that it requires several electrical or electronic devices for counting, determining accurate positions, etc.

It is accordingly the general object of the present invention to provide a method of quickly and inexpensively assembling roller bearings in a circumferential arrangement within a bearing bushing without the need of special counting devices, thus overcoming the disadvantages of the prior art.

A further more specific object of the present invention is to provide a method and apparatus for assembling roller bearings with a bearing bushing in which the individual roller bearings are initially fed to a circumferential path with the axes of the individual roller bearings parallel and aligned in the direction of insertion into the bushing.

Other objects, features and advantages of the present invention will become more apparent from the description of the invention in connection with the accompanying drawings to be described more fully hereinafter.

SUMMARY OF THE INVENTION

The foregoing objects of the invention are accomplished by successively feeding and supporting a plurality of roller bearings in the direction of insertion into the bearing bushing in a position along a circumferential path corresponding to the circumferential arrangement to be occupied by the roller bearings in the bushing, spacing the roller bearings about the circumferential path as the roller bearings are fed thereto, accumulating the roller bearings along the circumferential path with the axes of the roller bearings parallel to each other until a predetermined number of roller bearings are accumulated along the path, and simultaneously inserting all of the accumulated roller bearings axially into the bushing.

The advantage of the foregoing method in accordance with the present invention is that the individual roller bearings are successively fed and supported in the same direction in which they are inserted into the bearing bushing about a circumferential path which corresponds to the path to be occupied by the individual roller bearings in the bearing bushing. Accordingly, the actual operation of inserting the various roller bearings into the bearing bushing can begin as soon as the required number of roller bearings are accumulated on the circumferential path. Also, since the individual roller bearings are initially aligned in the direction of insertion into the bearing bushing, they can be gravitationally transported from a supply in the direction towards the bushing. This therefore eliminates the need for additional conveyor belts or electrically powered transporting devices for intermediate handling of the roller bearings.

Also, in accordance with the present invention, the apparatus for accomplishing the foregoing method includes an outer sleeve member and an applicator sleeve carried within the outer sleeve member for axial sliding movement between first and second positions. A piston is axially carried within the applicator sleeve for rotatable movement. An annular channel is formed between the piston and the applicator sleeve when the applicator sleeve is in the first position. A collector channel extends axially through the piston and a delivery opening is arranged at one end of the collector channel for feeding individual roller bearings to the annular channel. Individual roller bearings are fed from a supply to the other end of the collector channel. Means are provided for rotatably indexing the piston to evenly space the individual roller bearings about the annular channel as they are being fed from the collector channel to the annular channel. Means are also provided for moving the applicator sleeve from the first to the second position thus applying a force in the axial direction to each of the roller bearings accumulated within the annular channel to simultaneously move the accumulated roller bearings into a prepositioned bearing bushing.

One of the advantages of the foregoing arrangement is that the collector channel, which extends substantially axially through the piston, allows for free gravitational feeding of the roller bearings from the supply directly into the annular channel.

No grease or other elements are required for retaining the roller bearings in the annular channel. The required number of roller bearings will therefore freely slide into the annular channel during rotational indexing of the piston and will therefore automatically be lined up in the channel without encountering substantial friction. After the annular channel has been completely filled with roller bearings, the delivery opening from the collector channel into the annular channel will be blocked by the roller bearings in the annular channel. The delivery opening is therefore precisely dimensioned to leave no additional space for any further roller bearings. As the applicator sleeve moves to the second position for inserting the roller bearings from the annular channel into the bearing bushing, the delivery opening will again be closed by the applicator sleeve itself. Accordingly, when all the roller bearings are properly inserted into the bearing bushing and the applicator sleeve is moved back to the first position, the delivery opening will again be placed in communication with the annular channel so that the next roller bearing in the collector channel will automatically slip by gravitation directly into the empty annular channel.

The method and apparatus of the present invention requires no counting to determine the correct number of roller bearings in position for assembly with the bearing bushing.

Further, in order to ensure precise delivery of the roller bearings into the annular channel for subsequent insertion into the bearing bushing, the cross section of the delivery opening is substantially proportionate with the cross section of the roller bearings in the longitudinal direction.

Such a cross sectional configuration permits the roller bearings to be delivered from the collector channel axially extending through the piston into the annular channel about the piston in a substantially radial direction so as to be delivered directly into the annular channel.

A further feature of the present invention is to provide that the delivery opening be spaced a distance equal to approximately twice the length of an individual roller bearing from the bottom of the piston. This prevents the possibility of any obstructions in the area of the delivery opening which might be caused by possible displacement in the position of the bearing bushing and which might prevent proper feeding of the roller bearings directly into the annular channel.

Another important feature of the present invention is the provision of an elastic ring or collar seated in a circumferential groove formed either in the inner cylindrical wall of the outer sleeve or in the outer cylindrical wall of the piston, to define the lower boundary of the annular channel when the applicator sleeve is in its raised or first position. When the applicator sleeve is lowered to its second position to apply an axial force to the accumulated roller bearings in the annular channel, the roller bearings will engage the elastic collar forcing it to compress into the groove to allow the roller bearings to pass into the bearing bushing. The provision of the elastic ring, however, makes it impossible for the roller bearings to pass out of the annular channel in the direction toward the prepositioned bearing bushing until an appropriate force is applied to the roller bearings by the applicator sleeve.

BRIEF DESCRIPTION OF THE DRAWINGS

A preferred embodiment of the invention will be described hereinbelow in connection with the accompanying drawings, in which:

FIG. 3 is a sectional view of a portion of the apparatus shown in FIGS. 1 and 2 illustrating the relationship between the outer sleeve member, the applicator sleeve, and the piston forming an annular channel between the piston and the outer sleeve member for accumulating a plurality of roller bearings prior to assembly with the bearing bushing; and FIG. 4 is a view similar to that of FIG. 3 illustrating the position of the elements shown in FIG. 3 after the roller bearings have been assembled with the bearing bushing.

DESCRIPTION OF THE INVENTION

Figure 1:
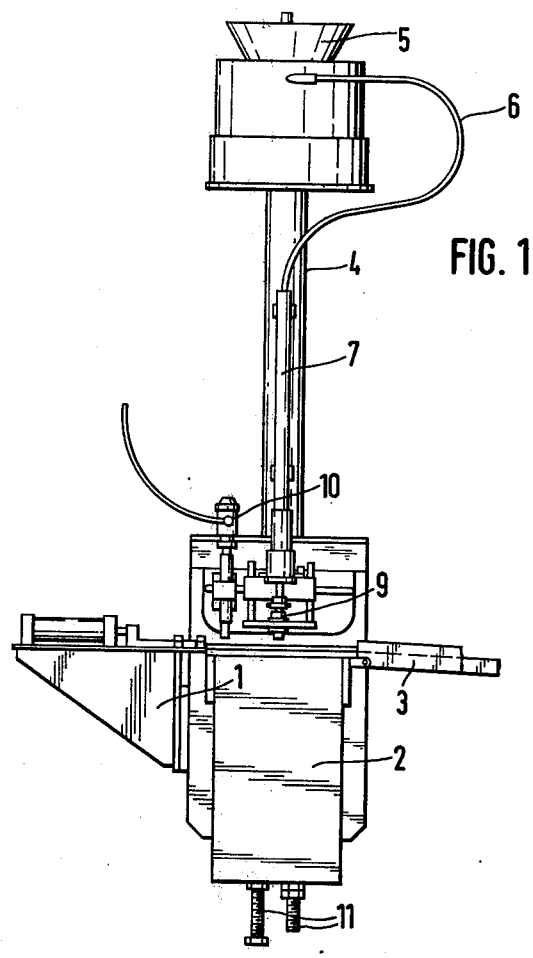
FIG. 1 is a front elevational view of the apparatus according to the present invention for assembling roller bearings with a bearing bushing.
Figure 2:
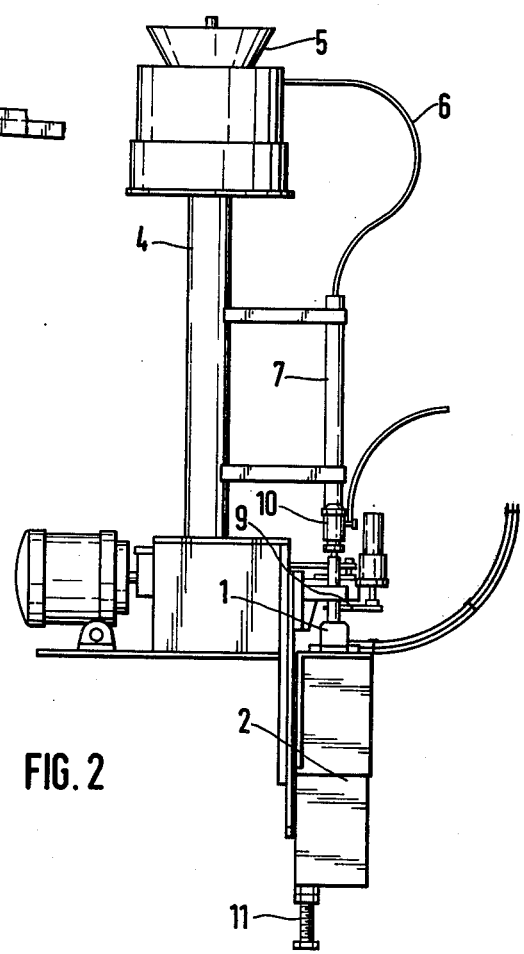
FIG. 2 is a side elevational view of the apparatus shown in FIG. 1.

Referring now in more detail to the accompanying drawings, conveyor 1 is provided for transporting bearing bushings 12 to an assembly station 9 where each bushing will be received on a table 2 which may be raised and lowered so that the roller bearings 14 may be inserted into each bearing bushing. After assembling the roller bearings in each bearing bushing, the bushing will be removed from the assembly station by a discharge transporter device 3. The apparatus of the present invention for assembling the roller bearings 14 with the bearing bushings includes a support stand 4 carried on a base member adjacent the table 2 for receiving the bearing bushings. A hopper 5 is mounted on the support stand 4 for receiving a supply of roller bearings to be fed to the assembly station 9 for assembly with the bearing bushing. A tube 6 is connected at one end to the hopper 5 and at its other end to a collector channel 7 which extends substantially axially through a piston 8. In this manner, roller bearings may be supplied from the hopper 5 through the tube 6 into the collector channel 7.

A grease gun or applicator 10 is carried on a support just prior to the assembly station 9 so that a charge of lubricating grease may be injected into each bearing bushing just prior to arriving at the assembly station 9. Appropriate hydraulic systems are connected with the grease gun 10 to supply the proper amount of grease.

Stop members 11 are provided on the movable table 2 for preselecting the maximum vertical movement of the table 2. Accordingly, the amount by which table 2 can be raised and lowered is adjustable through the use of stops 11.

FIGS. 3 and 4 show in enlarged sectional views the assembly station 9 for the operation of axially inserting or assembling the roller bearings, which have been fed into the collector channel 7, with a bearing bushing 12. FIG. 3 illustrates the position of a bearing bushing 12 as it is received on the table 2 at the assembly station when the table 2 is in its lowered position and prior to actual insertion of the roller bearings into the bushing. The bushing 12 located in this position will have received a charge of grease from grease gun 10.

At this point in the operation, roller bearings 14 have been fed from the hopper 5 through the tube 6 into the collector channel 7 of piston 8 where they will gravitationally drop down through the channel 7 to a delivery opening 15 which extends through a side wall of the piston 8. An outer sleeve member 18 is supported above the table 2 for receiving the piston 8. Appropriate support and drive means, such as a pulley and motor, are connected with the piston 8 for rotational indexing or oscillation. Outer sleeve member 18 may also be connected to appropriate drive means for rotational indexing or oscillating movement. Piston 8 and outer sleeve member 18 are mounted in a relative fixed axial or vertical position with respect to each other. An annular channel 13 is formed between the outside wall of piston 8 and the inside wall of bore 19 which axially extends through the outer sleeve member 18. An applicator sleeve 20 coaxially surrounds piston 8 and is received within bore 19. Applicator sleeve 20 is slidably arranged between piston 8 and outer sleeve member 18 for movement between a raised position, shown in FIG. 3, and a lowered position, shown in FIG. 4. Applicator sleeve 20 has an annular lower edge which defines the upper boundary of the annular channel 13 when applicator sleeve 20 is in the position shown in FIG. 3. The lower boundary of annular channel 13 is defined by an elastic ring or collar 16 which is supported in an annular groove 17 at the lower end of outer sleeve 18. Alternatively, elastic collar 16 may be carried in an annular groove on the outer wall of piston 8 without affecting the operation or function of the present invention.

With the applicator sleeve 20 in its raised position, annular channel 13 is formed between the bottom of the applicator sleeve 20 and the collar 16, and is in communication with the delivery opening 15. In this position, the roller bearings 14, which have gravitationally dropped through the collector channel 7 to the delivery opening 15, will pass into the annular channel 13. The cross section of the delivery opening 15 substantially equals the length of a roller bearing to permit direct feeding of each roller bearing 14 from the collector channel 7 into the annular channel 13 in a radial direction, while the axis of each roller bearing remains substantially aligned in the direction of insertion into the bearing bushing 12. Upon a predetermined amount of rotational indexing of piston 8, the next succeeding roller bearing will also pass through the delivery opening 15 into the annular channel 13. Rotational movement of piston 8 will continue until the channel 13 has been filled with a predetermined number of roller bearings 14, which is determined by the circumference of the annular channel 13 and the amount of rotational indexing of piston 8. When the annular channel 13 is filled with roller bearings 14, descent of any further roller bearings will be prevented by the last roller bearing in the channel 13 which will block delivery opening 15. To prevent obstruction of the delivery opening 15, the opening is spaced from the bottom of piston 8 by a distance of approximately twice the length of a roller bearing 14. The roller bearings 14 which have been accumulated in the annular channel 13 are arranged therein along a circumferential path which corresponds to the position to be occupied by the roller bearings within the bearing bushing. The longitudinal axis of each roller bearing in the annular channel 13 extends in the direction of insertion of each roller bearing into the bearing bushing. Accordingly, the axes of all the roller bearings within the annular channel are parallel.

To insert or otherwise assemble each of the roller bearings 14, which have been accumulated in the annular channel 13, table 2 is raised to a position where the bearing bushing 12 receives the lower end of piston 8. Appropriate means connected with the applicator sleeve 20 will then be activated to cause sleeve 20 to slidably move downwardly in the bore 19 to the position shown in FIG. 4. During the downward movement of the applicator sleeve 20, its annular lower edge will engage the plurality of roller bearings 14 in the annular channel 13 and force them past the elastic collar 16 and into the bearing bushing 12 where they will occupy the same circumferential position as occupied when in the annular channel 13. FIG. 4 illustrates the position of the bearing bushing after the roller bearings have been inserted into it. In the position shown in FIG. 4, the delivery opening 15 will be blocked by the applicator sleeve 20 to again prevent any roller bearings in the collector channel 7 from passing through the delivery opening 15.

When the table 2 is subsequently lowered, the appropriate amount of roller bearings will have been assembled with the bearing bushing 12. The roller bearings assembled with the bearing bushing will retain their position within the bushing by the charge of grease which was previously packed into the bushing by the grease gun 10. Any tilting or other dislocating movement of the various roller bearings within the bearing bushing will therefore be prevented during normal subsequent handling of the assembled bearing bushing. Simultaneously with the lowering of the table 2 and the bearing bushing 12 from the piston 8, applicator sleeve 20 will be vertically moved to its initial position. Upon upward movement of the applicator sleeve 20, its lower annular edge will move upwardly past the elastic collar 16 allowing it to expand and again form the lower boundary of the annular channel 13. As the applicator sleeve 20 continues to move upwardly, it will again open communication between the delivery opening 15 and the annular channel 13 to permit further feeding of roller bearings 14 into the channel so that a new set of roller bearings may be accumulated within the annular channel 13 for insertion into the next bearing bushing which will be advanced to the assembly station.

While the present invention has been described and illustrated with respect to a certain preferred embodiment which produces satisfactory results, it will be appreciated by those skilled in the art after understanding the purposes of the invention, that various changes and modifications may be made without departing from the spirit and scope of the invention and it is therefore intended to cover all such changes and modifications in the appended claims.

What is claimed is:

1. An apparatus for assembling roller bearings in a bearing bushing comprising an axially immovable outer sleeve member, an applicator sleeve carried within and coaxial with said outer sleeve member for axial sliding movement with respect to said outer sleeve member between a first position and a second position, a piston coaxial with and carried within said applicator sleeve for rotatable movement with respect thereto, said piston axially fixed with respect to said outer sleeve member, said piston and said applicator sleeve forming an annular channel therebetween when said applicator sleeve is in said first position, a collector channel extending substantially axially through said piston, a delivery opening at one end of said collector channel extending through said piston obliquely of said collector channel and communicating between said collector channel and said annular channel, and means connected with the other end of said collector channel for supplying roller bearings thereto, whereby a plurality of said roller bearings are fed into said annular channel for simultaneous insertion into a bearing bushing when said applicator sleeve is moved from the first position into the second position.

2. The apparatus according to claim 1 wherein said delivery opening has a cross section in the axial direction of said piston corresponding to the axially extending cross section of said roller bearings.

3. The apparatus according to claim 1 wherein said delivery opening is positioned a distance corresponding to at least double the length of a single roller bearing from the end of said piston closer to said positioning means for the bearing bushing.

4. The apparatus according to claim 1 further comprising that said outer sleeve member extends vertically, an annular groove defined in the inner surface of said outer sleeve member at the lower end of said annular channel, and an elastic ring carried in said annular groove.

5. The apparatus according to claim 1 further comprising that said piston extends vertically, an annular groove in the outer wall of said piston at the lower end of said annular channel, and an elastic ring carried in said annular groove.

* * * * *